United States Patent
Scheiner et al.

[15] 3,639,925
[45] Feb. 8, 1972

[54] RECOVERY OF GOLD FROM CARBONACEOUS ORES

[72] Inventors: Bernard J. Scheiner, Sparks; Ronald E. Lindstrom, Reno, both of Nev.; Thomas A. Henrie, Silver Spring, Md.

[73] Assignee: The United States of America as represented by the Secretary of the Interior

[22] Filed: Nov. 17, 1970

[21] Appl. No.: 90,428

Related U.S. Application Data

[62] Division of Ser. No. 729,382, May 15, 1968, Pat. No. 3,574,600.

[52] U.S. Cl. ............................75/101 R, 75/105, 75/106, 75/107, 75/118, 204/95
[51] Int. Cl. ........................................C22b 11/08
[58] Field of Search ..............75/118, 101 R, 105, 106, 107; 204/95

[56] References Cited

UNITED STATES PATENTS

| 731,590 | 6/1903 | Merrill | 75/105 |
| 987,964 | 3/1911 | Crowe | 75/118 |
| 541,374 | 6/1895 | Mierisch | 75/118 |
| 694,349 | 3/1902 | Cassel | 75/118 |
| 1,113,323 | 10/1914 | Foye et al. | 75/118 X |
| 1,184,456 | 5/1916 | James | 75/118 X |
| 3,476,552 | 11/1969 | Parks et al. | 75/101 |

*Primary Examiner*—L. Dewayne Rutledge
*Assistant Examiner*—G. T. Ozaki
*Attorney*—Ernest S. Cohen and William S. Brown

[57] ABSTRACT

Carbonaceous gold ores are rendered amenable to a conventional cyanide recovery process by pretreatment with sodium hypochlorite or calcium hypochlorite compounds at temperatures under 70° C. Hypochlorite solutions can be generated in situ by electrolysis of chloride solutions.

5 Claims, No Drawings

RECOVERY OF GOLD FROM CARBONACEOUS ORES

This application is a division of application Ser. No. 729,382, filed May 15, 1968, now U.S. Pat. No. 3,574,600.

BACKGROUND OF THE INVENTION

1. Field of Invention

This invention relates to the recovery of gold from carbonaceous gold ores. More particularly, the invention concerns an improved cyanide leach of these ores wherein the ore is treated prior to the cyanide leach. Used herein, the term "carbonaceous ore" refers to a refractory ore, that is, one not amenable to a conventional cyanide treatment, and one which contains carbonaceous impurities capable of absorbing a gold-cyanide complex. These ores generally contain from about 0.25-0.8 percent by weight of organic carbon having properties similar to humic acid. The total carbon content of the ores averages from 2-5 weight percent with selected portions of the ore containing as much as 12 percent carbon. Ores of this type are found intermingled with oxide gold ores throughout the world. They are particularly prevalent wherever the gold deposit is the result of hydrothermal deposition of carbonaceous strata. Large bodies of carbonaceous ores are found in South Africa and in the states of Nevada, Utah, Montana, California and Idaho of the United States. Conventional cyanide processes can recover only 25-35 percent of the gold present in carbonaceous ores. At present, there are large amounts of both located carbonaceous deposits and stocks of mined carbonaceous ore which have been set aside because it has heretofore been uneconomic to treat them by the conventional cyanide process.

2. Description of the Prior Art

Previous methods for rendering carbonaceous gold ores amenable to cyanide treatment have involved treating the ore with mineral oils as disclosed in U.S. Pat. Nos. 1,411,326 and 1,461,807 or with wetting agents as described in U.S. Pat. No. 2,234,140. Whereas this type of treatment lessens premature physical absorption of gold cyanide complex on the inorganic carbon present in some gold ores such as graphite from graphitic schists and other forms of inorganic carbon, we have found that it does not prevent the even more deleterious chemical absorption attributed to the organic carbon present in carbonaceous ores. No prior process has been designed to prevent such absorption of the gold cyanide complex. Consequently there remains a need in the art for a process which will enable economic recovery of gold from the large known sources of carbonaceous ores.

SUMMARY OF INVENTION

Briefly, the present invention presents a method whereby the ability of the carbonaceous impurities contained in carbonaceous ores to absorb the gold-cyanide complex formed in the cyanide process is destroyed prior to cyanidation. This is accomplished by treating an aqueous slurry of the ore at a temperature of less than 70° C., with an alkaline hypochlorite salt or an alkaline hypochlorite formed in situ by chemical reaction or by electrolysis of chloride solutions.

DESCRIPTION OF THE PREFERRED EMBODIMENTS

The starting materials upon which the present invention operates have been termed "carbonaceous ores," a specific type of gold ore which is capable of absorbing $Au(CN)_2^-$. Heretofore it has not been recognized that gold ores were capable of absorbing the gold-cyanide complex by chemical as well as physical absorption. Our studies have established that carbonaceous gold ores containing organic carbon do in fact absorb the complex by both mechanisms. Examples I and II below are clear illustrations of the phenomena. As shown in Example III below, contacting the ore with large amounts of kerosene, a treatment which has previously been shown by others to be effective in preventing physical absorption, does not eliminate the problem of complex absorption. It is our discovery that pretreatment of carbonaceous ores at a temperature less than 70° C. with an alkaline hypochlorite will prevent absorption of the complex by carbonaceous impurities and will for the first time allow an economical recovery of gold from carbonaceous ores.

Refractory gold ores have previously been treated with acid systems such as for example the acid oxidation described by Hedley at al. in U.S. Pat. No. 2,777,764. There, refractory precious metal ores are contacted with large amounts of acidic oxidizing agents, preferably an $H_2SO_4$ air system, under high pressures and at temperatures in the range of from 120°-130° C. The purpose of the treatment is to oxidize the ore so that the various impurities do not consume the oxygen necessary for the formation of the $Au(CN)_2^-$ complex during cyanidation. As the impurities react with the oxidant they in turn form additional acid. In contradistinction, our process is not designed to enhance the formation of the complex but rather to prevent the absorption of the complex by the carbonaceous impurities after it has been formed.

Hypochlorites have previously been used as a pretreatment for oxidizing impurities in gold ores which would consume the oxygen necessary during cyanidation. U.S. Pat. No. 731,590 to Merrill is an example of such a process. There, refractory ores containing materials which prevent cyanidation by removing oxygen from solution are oxidized with a hypochlorite prior to cyanidation. The present invention, which also contemplates a hypochlorite pretreatment is not concerned with ores of the type described by Merrill, but is limited to "carbonaceous ores" which do not prevent cyanidation by consuming oxygen but rather by absorbing the gold-cyanide complex after it has been formed. Example V below shows that even if massive quantities of air are provided during cyanidation, very little gold is recovered.

Treatment of carbonaceous ore with hypochlorite is accomplished by adding sodium or calcium hypochlorite in solid or solution form to an aqueous slurry of ground ore. High-density slurries of about 1:1 liquid to solids are preferred. The amount of hypochlorite used will vary with the ore undergoing treatment as will the length of contact. The temperature of the slurry should be less than 70° C. and should be maintained in the range of from ambient to 60° C., with temperatures of from 50° to 60° C. being preferred. Lime may be added to the aqueous slurry along with the hypochlorite to enhance the treatment but is not necessary.

As a further embodiment to the invention, hypochlorite may be formed in situ chemically or electrolytically. In situ formation by chemical reaction is accomplished by adding both sodium hydroxide and chlorine to the ore slurry. Electrolytic formation of hypochlorite is accomplished by electrolysis of a sodium chloride solution. The latter method can be used to form hypochlorite which is added to the ore slurry and the entire slurry electrolyzed. Electrolysis of sodium chloride is a particularly attractive method of producing the treatment agent at remote sites. Also, if electrolysis is used less external heat is needed during the treatment.

After the pretreatment discussed above, the ore may be passed to a conventional cyanidation with markedly improved recoveries. In this respect, the following examples are provided to set forth and illustrate the invention.

EXAMPLE I

An ore containing 0.23 oz./ton gold, and 0.97 percent total carbon including 0.35 percent organic carbon was contacted with a synthetic solution of $Au(CN)_2^-$ having a concentration of 11.1 g./l. for 2 hours. Upon assay it determined that the ore had absorbed 12.5 oz. of gold per ton of ore.

EXAMPLE II

An ore containing 0.06 oz./ton gold and 10.1 percent total carbon including 4 percent organic carbon was contacted for 2 hours with the synthetic $Au(CN)_2^-$ solution used in Example I. Upon assay it was determined that this ore absorbed gold at the rate of 139.9 oz./ton of ore.

EXAMPLE III

The ore used in Example II was contacted with 8 gal./ton of kerosene prior to contact with the $Au(CN)^-_2$ complex as in Example II. Upon assay it was determined that the kerosene treated ore absorbed gold at the rate of 111.9 oz./ton of ore.

Example I and II illustrate the phenomena of $Au(CN)^-_2$ absorption by carbonaceous gold ores. Example III illustrates the nature of the absorption. There, a kerosene treated ore absorbed 85 percent as much gold as the same ore without kerosene treatment. This shows that the prior methods of dealing with carbonaceous gold ores which were directed at physical absorption were only attacking a small portion of the total problem.

EXAMPLE IV

One hundred grams of an ore containing 0.23 oz./ton of gold and 0.35 percent by weight organic carbon was slurried with 300 ml. of water 0.25 g. lime and 0.10 g. sodium cyanide, stirred for 24 hours and filtered. The tailings were assayed and gold extraction was calculated at 25–30 percent.

This example illustrates the poor recovery of gold from carbonaceous ores resulting from conventional cyanidation.

EXAMPLE V

The procedure of Example IV was repeated and massive quantities of air were bubbled through the slurry during cyanidation. Upon assaying the tailings it was found that the addition of excess air had no effect upon gold recovery.

This example shows that the problem with carbonaceous ores is not that they act as reducing agents and absorb oxygen necessary for cyanidation, for even with excess oxygen present carbonaceous ores do not respond favorably to a cyanide leach.

EXAMPLE VI

One hundred grams of an ore containing 4.8 percent total carbon of which 0.42 is organic and 0.36 oz./ton of gold was treated to a conventional cyanidation as in Example IV gold recovery was 25 percent.

One hundred grams of the same ore was slurried with 150 ml. of water. To this there was added 1 g. of lime and 1 g. NaOCl. The slurry was then heated at 60° C. for 1 hour. During the following hour, while still at 60° C., an additional 0.5 g. of NaOCl was added to the slurry. Heating was continued for an additional 6 hours at 60° C. Then 0.10 g. of sodium cyanide was added and the mixture stirred for 24 hours. Gold extraction was calculated at 96 percent.

EXAMPLE VII

Three hundred grams of the type ore used in Example I was slurried with 2 liters of 0.4 percent sodium hydroxide solution. Chlorine gas was then bubbled through the slurry at the rate of 4.8 g./hour of 1.33 hours. The final pH was 7.3. The slurry was then filtered, repulped and treated by conventional cyanidation. Gold recovery was 92 percent.

EXAMPLE VIII

One hundred grams of the type ore used in Example IV was slurried with 300 ml. of water. Then, 30 g. of NaCl was added. The slurry was then placed in an electrolytic cell having a graphite anode and a copper cathode. A 2 amp current at 5 volts was passed through the cell for 30 minutes. The slurry was constantly stirred during this time period. The electrodes were removed and the temperature was increased from room temperature to 60° C. for 2 hours with continual stirring. The slurry was then filtered and repulped with 300 mils of water before conventional cyanidation. Gold recovery was 85 percent. It was expected that with more sophisticated equipment, the percent gold recovered using in situ electrolysis will be equal to that obtained in the other embodiments of the invention.

Examples VI, VII, and VIII illustrate the improved recovery of gold from carbonaceous ores made possible by a treatment with hypochlorite before cyanidation. Further, the latter two examples illustrate the various means of in situ hypochlorite production.

Though the invention has now been described with reference to preferred embodiments and specific examples, it will readily be appreciated by those of ordinary skill in the art that many modifications and adaptions of the invention are possible without departure from the spirit and scope of the invention as claimed hereinbelow.

What is claimed is:

1. A method of treating carbonaceous gold ores to prevent absorption of $Au(CN)^-_2$ during a subsequent cyanide leach comprising treating an aqueous slurry of said ore with an alkaline hypochlorite from the group consisting of sodium hypochlorite and calcium hypochlorite at a temperature of less than 70° C.

2. The method of claim 1 wherein the alkaline hypochlorite is sodium hypochlorite.

3. The method of claim 2 wherein said sodium hypochlorite is formed in situ within said slurry by adding sodium hydroxide and chlorine to the slurry.

4. The method of claim 2 wherein said sodium hypochlorite is formed by electrolysis of a sodium chloride solution.

5. The method of claim 2 wherein said sodium hypochlorite is formed in situ within said slurry by adding sodium chloride to the slurry and then electrolyzing.

* * * * *